US005729335A

United States Patent [19]
Green

[11] Patent Number: 5,729,335
[45] Date of Patent: Mar. 17, 1998

[54] OPTICAL FIBER MONITORING APPARATUS AND AN ASSOCIATED METHOD FOR MONITORING BENDING OR STRAIN ON AN OPTICAL FIBER DURING INSTALLATION

[75] Inventor: Samuel L. Green, St. Louis, Mo.

[73] Assignee: McDonnell Douglas Corporation, St. Louis, Mo.

[21] Appl. No.: 701,976

[22] Filed: Aug. 23, 1996

[51] Int. Cl.$^6$ .................................................. G01B 11/16
[52] U.S. Cl. ................................. 356/73.1; 250/227.16
[58] Field of Search ...................... 356/73.1; 250/227.15, 250/227.16

[56] References Cited

U.S. PATENT DOCUMENTS

| | | |
|---|---|---|
| 2,586,806 | 2/1952 | Fowler . |
| 3,284,707 | 11/1966 | Clinton . |
| 3,689,832 | 9/1972 | Leto et al. . |
| 3,758,855 | 9/1973 | Meyer . |
| 3,903,471 | 9/1975 | Hiraga et al. . |
| 4,004,223 | 1/1977 | Cohen . |
| 4,160,206 | 7/1979 | Bojarski . |
| 4,163,936 | 8/1979 | Shufro . |
| 4,288,161 | 9/1981 | Fortescue ..................... 356/73.1 X |
| 4,339,658 | 7/1982 | Fromm et al. . |
| 4,426,617 | 1/1984 | Forrester . |
| 4,559,497 | 12/1985 | Farrugia . |
| 4,708,422 | 11/1987 | Arnoux et al. .................. 356/73.1 X |
| 4,947,693 | 8/1990 | Szuchy et al. ..................... 73/800 |
| 5,093,569 | 3/1992 | Krumboltz et al. ............. 250/226.16 |
| 5,160,972 | 11/1992 | Walters et al. ...................... 356/32 |
| 5,196,899 | 3/1993 | Serwatka .......................... 356/73.1 |
| 5,270,537 | 12/1993 | Jacobs ........................... 250/227.15 |
| 5,319,306 | 6/1994 | Schuyler . |
| 5,436,444 | 7/1995 | Rawson ........................... 250/227.14 |

OTHER PUBLICATIONS

National Semiconductor Specification, *LM131A/LM131, LM231A/LM231, LM331A/LM331 Precision Voltage–to–Frequency Converters*, pp.8–251–8–261, 1982.

*Primary Examiner*—Vincent P. McGraw
*Attorney, Agent, or Firm*—Bell Seltzer Intellectual Property Law Group of Alston & Bird LLP

[57] ABSTRACT

An optical fiber monitoring method and apparatus is described for monitoring the signal loss within an optical fiber during installation of the optical fiber. The apparatus contains a jig for advancing the optical fiber along a predetermined path, a light source for transmitting light signals along the optical fiber, and a light sensor for detecting the light signals. The detected light signals are converted to an audible signal having a frequency which varies in relation to the detected signal. An audio transducer then outputs the audible signal. Since the frequency of the audio signal is a measure of the signal loss along the optical fiber and, therefore, is a measure of the amount by which the optical fiber is bent during the installation process, the audible signal can be monitored in an "eyes-free" manner to detect excessive bending of the optical fiber in order to prevent damage to the optical fiber during installation.

17 Claims, 2 Drawing Sheets

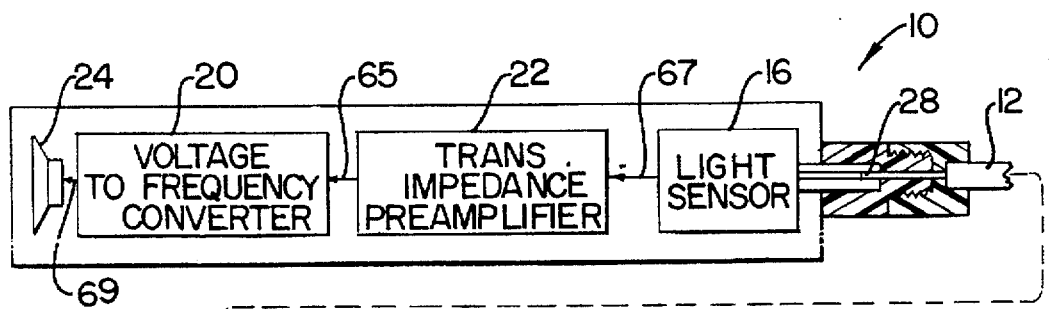
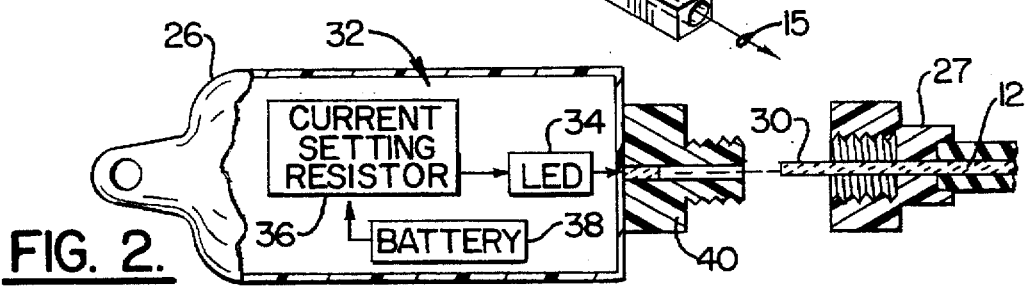
FIG. 1.
FIG. 2.
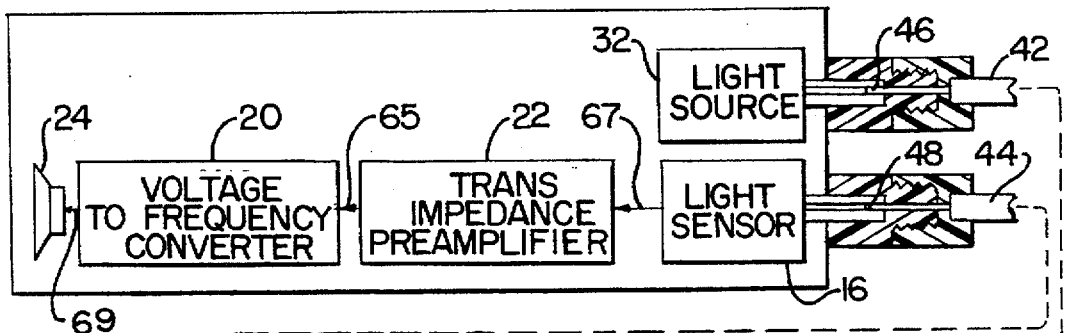
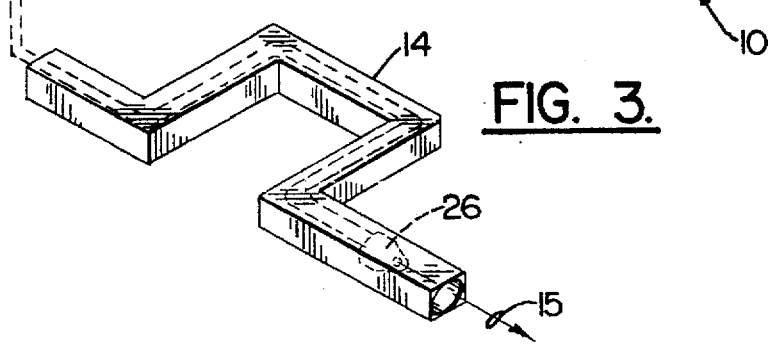
FIG. 3.

OPTICAL FIBER MONITORING APPARATUS AND AN ASSOCIATED METHOD FOR MONITORING BENDING OR STRAIN ON AN OPTICAL FIBER DURING INSTALLATION

FIELD OF THE INVENTION

The present invention relates to an apparatus for facilitating the installation of optical fibers. In particular, the present invention relates to an apparatus for efficiently and conveniently monitoring the bending or strain on optical fibers during installation so as to provide a warning of impending fiber breakage.

BACKGROUND OF THE INVENTION

The expanding use of optical fibers has had a significant impact on the field of telecommunications, as well as many other technical fields. Optical fibers are now used in many technical applications which traditionally utilized metallic electrical wiring. This movement to optical communications and optical data transmission has been driven, at least in part, by the superior properties and improved performance of optical fibers relative to metallic wires. For instance, optical fibers have a large bandwidth, a relatively low signal loss and relatively rapid transmission rates. Further advantages of optical fibers lie in their relatively light weight when compared to traditional metallic wire and their inherent immunity to electro-magnetic interference (EMI).

As a result of these superior properties, optical fibers are extremely useful in the aircraft and aerospace industry which continues to demand increased signal and/or data transmission capabilities without permitting corresponding increases in the weight of the aircraft. By utilizing optical fibers in lieu of metallic wires, however, the signal transmission capabilities of an aircraft can be increased without increasing the overall weight of the aircraft. In fact, in many instances in which optical fibers replace metallic wires, the overall weight of the aircraft may actually be decreased even though the signal transmission characteristics are enhanced.

Despite their many advantages, optical fibers have some properties which hinder or limit their use in many applications. First, optical fibers are fragile and can be easily damaged without proper and, oftentimes, delicate handling. In addition, optical fibers most efficiently transmit signals in instances in which the optical fibers are disposed either linearly or are bent slightly, since signal transmission losses are introduced if the fibers are curved or bent to a severe degree. In particular, an optical fiber which is bent beyond a predetermined minimum bend radius allows an increasing portion of the light signals to escape from the core and to pass to and through the cladding layer, thereby reducing the efficiency of signal transmission within the core. Optical signals which are transmitted by an optical fiber will become increasingly more attenuated as the optical fiber is bent further. In addition, if an optical fiber is bent beyond a minimum bend radius at which signal transmission loss increases noticeably, the fiber breaks, thereby rendering the fiber useless. Thus, the signal transmission loss effects of bending an optical fiber can reliably predict impending breakage of the fiber.

The fragility of optical fibers has created many installation problems. Frequently, optical fibers must be routed along a predetermined path, such as through a wiring duct which twists and turns. In many cases in which optical fibers have replaced traditional metallic wires, the predetermined paths along which the optical fibers are routed have not been redesigned, i.e., straightened, to accommodate the more fragile optical fibers. Further, most installers have traditionally installed metallic wiring. As a result, these installers are not accustomed to the delicate handling required for proper optical fiber installation and may inadvertently damage the optical fibers by pulling the optical fibers along the predetermined route in a manner suitable for electrical wiring, but which bends the optical fibers too sharply.

These installation problems can combine to cause many difficulties in the development and use of optical fiber communications systems. For example, optical fibers installed along an intricate routing path may be sharply bent in an intermediate portion of the routing path which is not visible to the installation personnel. In particular, the optical fibers may be pulled through a wiring duct or other conduit which sharply twists such that the optical fibers are bent excessively and, in some instances, broken in an intermediate portion of the conduit which is not visible from either end. The breakage introduced by the sharp bend in the optical fibers may not be discovered until the installation is complete, thereby rendering the optical fibers unsatisfactory for use. In these situations, the optical fibers must then be removed and replaced, thereby further increasing the installation costs and delaying the production schedules.

SUMMARY OF THE INVENTION

In light of the above problems, it would be advantageous to monitor the bending or strain on optical fibers during the installation of the optical fibers. As set forth below, the optical fiber monitoring method and apparatus of the present invention provides such advantages by continuously monitoring one or more optical fibers in a cable during installation. The optical fiber monitoring method and apparatus of the present invention allows for efficient and convenient installation of the optical fibers by providing an audible sound which varies in frequency in relation to the intensity of the signals transmitted via the optical fiber. By listening to the variations in frequency of audible sounds emitted by the monitoring method and apparatus of the present invention, installation personnel can quickly and easily determine, in an "eyes-free" manner, the affects of installation on the signal transmission characteristics of the optical fibers as the optical fibers are being installed. Due to the extreme sensitivity of the human ear to small changes in pitch, the optical fiber monitoring method and apparatus of the present invention provides ample warning of breakage due to excessive bending.

The real time feed back provided by the optical fiber monitoring method and apparatus of the present invention allows the installation personnel to modify the installation procedure if the audible signal indicates that the optical fibers are excessively bent or are about to be damaged, but before breakage occurs. By monitoring the stress imparted to the optical fibers during the installation process, the optical fiber monitoring method and apparatus also permits the installation personnel to identify the specific portions of the routing path that induces significant amounts of stress on the optical fibers. Accordingly, the routing path can be redesigned, if necessary, to alleviate at least some of the stress previously imparted to the optical fibers.

These and other advantages are provided, according to the present invention, by an apparatus and an associated method for monitoring signal loss along an optical fiber during installation of the optical fiber. The optical fiber monitoring apparatus preferably includes a jig connected to one end of the optical fiber for facilitating installation of the optical fiber. The optical fiber monitoring apparatus also includes a light source which provides a steady, continuous light signal to the optical fiber and a light sensor which detects the light signal following propagation through the optical fiber. The light sensor outputs a signal based upon the detected light signal. The optical fiber monitoring apparatus further includes a converter which converts the output signal from the light sensor to an audio signal having a frequency which varies in relation to the detected light signal. Finally, the optical fiber monitoring apparatus includes an audio transducer which outputs the audio signal having a variable frequency such that signal loss along the optical fiber, due to bending during installation, can be monitored based upon frequency variations in the audio signal. By listening to the audible signals emitted by the optical fiber monitoring method and apparatus of the present invention, the installation personnel can detect bends in the optical fiber and, more particularly, bends which either approach or exceed the safe minimum bend radius of the optical fiber, thereby alerting the installation personnel of impending optical fiber damage before breakage occurs and while there is still a chance to modify the installation method to avoid breakage.

In one advantageous embodiment of the present invention, the optical fiber monitoring apparatus includes means for adjusting the nominal frequency of the audio signals emitted by the converter, i.e., the frequency of the audio signals emitted by the converter in instances in which the optical fiber is not bent. Thus, the frequency of the audio signals can be adjusted such that the audio signals are pleasing, or at least less annoying, to the installation personnel.

The optical fiber monitoring apparatus of another advantageous embodiment also includes processing means for determining a time rate of change of the frequency of the audio signals provided by the converter. The optical fiber monitoring apparatus of this embodiment can also include volume control means for adjusting the volume of the audio signals output by the audio transducer in response to the time rate of change of the frequency of the audio signals. By adjusting the volume, such as by increasing the volume, upon determining that the frequency of the audio signals is changing rapidly, the optical fiber monitoring method and apparatus of the present invention further alerts the installation personnel to halt the installation procedure since the optical fiber may have been bent excessively, while being quieter and less annoying when the optical fiber is not bent.

In a further embodiment of the present invention, the optical fiber monitoring method and apparatus monitors signal loss along more than one of a plurality of optical fibers which are being installed. Each of the optical fibers within a cable extends between opposed first and second ends. In order to monitor all or some of the optical fibers concurrently, the jig of this embodiment is designed to connect or jumper the second ends of the optical fibers. Likewise, the first ends of a number of the optical fibers are optically connected or jumpered to thereby establish a continuous optical path through the plurality of optical fibers.

The light source and the light sensor of this further embodiment can be connected to the opposed ends of the continuous optical path defined by one or more optical fibers. Alternatively, the light sensor and light source can be connected to the same end of the continuous optical path defined by a single optical fiber, while the end of the optical fiber which defines the other end of the continuous optical path is coated with a reflective coating. According to either embodiment, however, the light signals provided by the light source must travel through a continuous optical fiber at least once and, in some embodiments, twice prior to detection by the light sensor. Thus, the optical fiber monitoring method and apparatus of the present invention can effectively monitor the stresses imparted to any one of a plurality of optical fibers at the same time. While each configuration of the present invention effectively monitors the stress imparted to the optical fibers during installation, these different configurations allow for flexibility of equipment placement during the installation process.

In operation, an optical fiber is advanced along a predetermined route while a light signal is transmitted therethrough. Following propagation through the optical fiber, the light signal is detected and an audio signal is generated which has a frequency which varies in relation to the detected light signal. By listening to the frequency variations in the audio signal, installation personnel can detect signal loss along the optical fiber, such as signal loss introduced by excessive bending of the optical fiber during installation. Accordingly, the installation process can be halted or otherwise modified upon detecting that the optical fiber is being excessively bent to prevent damage to the optical fiber.

Moreover, by monitoring the stress imparted to the optical fiber by listening for variations in the frequency of the audio signal, the installation personnel can effectively monitor the stress imparted to the optical fiber in an "eyes-free" manner, that is, without the burden of reading a digital display or other type of visual indicator. Accordingly, the optical fiber monitoring method and apparatus of the present invention is particularly advantageous for monitoring the stress imparted on an optical fiber while the installer looks elsewhere. Further, the variable frequency audio signal could be transmitted to a remote location, such as via a telephone or radio circuit, to permit remote monitoring of the stresses imparted to the optical fibers, such as in instances in which the measurement and installation points are at different locations. For example, the light source and sensor can be disposed at one location, while the installer who will monitor the variable frequency audio signal is at a second location to which the optical fiber is being pulled.

BRIEF DESCRIPTION OF THE DRAWINGS

FIG. 1 is a schematic representation of an optical fiber monitoring apparatus of one embodiment of the present invention which also illustrates the installation of an optical fiber along a predetermined route.

FIG. 2 is a schematic view of a jig which includes a light source according to one embodiment of the present invention.

FIG. 3 is a schematic representation of an optical fiber monitoring apparatus of another embodiment of the present invention which illustrates the installation of a pair of optical fibers along a predetermined route.

DETAILED DESCRIPTION OF THE PREFERRED EMBODIMENTS

Figure 4:
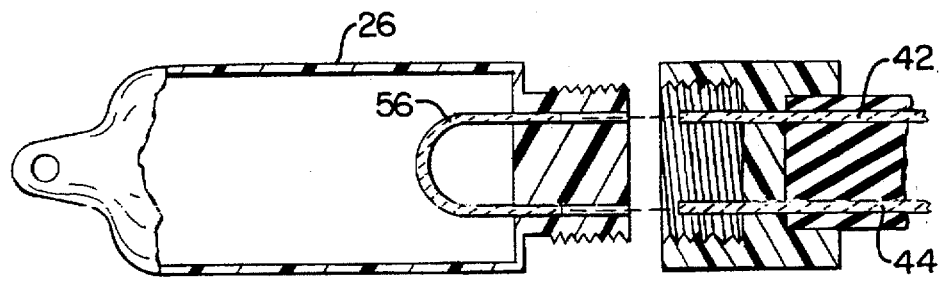
FIG. 4 is a cross-sectional view of a jig of another embodiment of the present invention which illustrates the optical interconnection of a plurality of optical fibers.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like reference characters designate like or corresponding parts throughout the several views.

The optical fiber monitoring method and apparatus 10 of the present invention can monitor the stresses imparted to an optical fiber 12 during the installation of a cable having one or more optical fibers. Typically, the optical fibers are installed along a predetermined route, such as by pulling the optical fibers in the direction of arrow 15 as described below. As shown in FIG. 1, the predetermined route can be defined by a wiring duct or other conduit 14. However, the optical fiber monitoring method and apparatus of the present invention is not limited to monitoring the stresses imparted on optical fibers which are pulled through ducts or conduits.

As illustrated in FIG. 2, the optical fiber monitoring apparatus 10 includes a light source 32 which is optically connected to one end of the optical fiber 12 for transmitting light signals through the optical fiber. The light source is preferably a low numerical aperture source. For example, the light source can include a light emitting diode (LED) 34 which emits light signals which are coupled to the optical fiber 12. Alternatively, the light source can include a diode laser or any stable light source including an incandescent lamp.

The optical fiber monitoring apparatus 10 of FIG. 1 also includes a light sensor 16, such as a photodiode, which is optically connected to one end of the optical fiber 12 and which detects a light signal following propagation of the light signal through the optical fiber. The light sensor provides an output signal 67 based upon the detected light signal. In particular, the light sensor 16 typically provides a photocurrent which varies in relation to the intensity of the detected signal. As shown in FIG. 1, the optical fiber monitoring apparatus can also include a transimpedance preamplifier 22 which amplifies the output signal and which converts the photocurrent to a corresponding output voltage 65.

The optical fiber monitoring apparatus 10 also includes a converter 20, responsive to the light sensor 16 and the transimpedance preamplifier 22, to convert the output signal 65 provided by the transimpedance preamplifier 22 to a signal 69 having a frequency which varies in relation to fluctuations in the voltage signal 65 and, in turn, to the intensity of the light signal. For example, the converter can be an LM131 or LM331 voltage-to-frequency converter that is commercially available from National Semiconductor. According to one advantageous embodiment, the variable frequency signal 69 provided by the converter 20 is supplied to an audio transducer 24, such as a loudspeaker, for audibly emitting the variable frequency signal.

The optical fiber monitoring apparatus 10 further includes a jig 26 which is operably connected to the second end 30 of the optical fiber 12, i.e. the end of the optical fiber which is pulled along the predetermined route. The jig 26 is pulled, such as by an installer, to advance the optical fiber along the predetermined route. In one embodiment of the invention, the jig 26 contains a connector 40, as shown in FIG. 2, for operably connecting the jig 26 with the second end of optical fiber and, more particularly, with a connecter 27 mounted on the second end of the optical fiber.

In one embodiment of the invention, the light source 32, as shown in FIG. 2, is optically connected to the second end 30 of the optical fiber 12 and transmits the light signal through the optical fiber 12. In the illustrated embodiment, the light source 32 includes an LED 34 for emitting a stable light signal. The light source of this embodiment can also include a battery 38 and a resistor 36 to set the drive current supplied to the LED. By controlling the current supplied to the LED 34, the resistor can regulate the intensity of the light signals emitted by the LED. Since the intensity of the light signal detected by the light sensor 16 is dependent, at least in part, upon the intensity of the light signals provided by the light source, the nominal intensity of the light signals detected by the light sensor and, therefore, the nominal frequency of the audible signals 69 generated by the convertor 20 and broadcast by the audio transducer 24 can be controlled by adjusting the current supplied to the LED. Thus, the LED is preferably supplied with a drive current which causes the converter to produce audible signals having a nominal starting frequency in a desired range. In one preferred embodiment suitable for testing a single optical fiber, the light source 32 is operably disposed in jig 26 as shown in FIG. 2.

In operation, the optical fiber 12 is installed by advancing an optical fiber 12 along a predetermined path. As shown in FIG. 1, the optical fiber can be installed by connecting a jig 26 to the second end 30 of the optical fiber 12 and by pulling the jig 26 and, therefore, the optical fiber along a predetermined path. While the optical fiber is pulled along the predetermined path, the light source 32 transmits a light signal through the optical fiber 12. As described above, the light sensor 16 detects the light signal following propagation of the light signal through the optical fiber 12 and provides or outputs photocurrent 67 based upon the intensity of the light signal. The photocurrent is amplified and converted by the transimpedance preamplifier 22 to a corresponding voltage signal 65. The convertor 20 then converts the amplified signal 65 to a variable frequency signal 69 which varies in frequency in relation to the intensity of the light signal. The variable frequency signal 69 is then output or broadcast by the audio transducer 24. Accordingly, the installation personnel can monitor bending of optical fiber 12 in an eyes-free manner by listening to the frequency variations in the audible signal.

Since the light source 32 preferably provides a very stable light signal that does not vary noticeably in intensity, installation personnel can generally interpret variations in the frequency of the audio signal as an indication that the optical fiber 12 is being bent during the installation process. As a result, the installation personnel can halt the installation of the optical fiber, preferably prior to permanently damaging the optical fiber, and can attempt to re-install the optical fiber in a different manner so as to alleviate the stress imparted thereon.

The optical fiber monitoring apparatus 10 of the present invention can also be configured to monitor the stress imparted on multiple optical fibers. For example, the optical fiber monitoring apparatus of FIG. 3 monitors a pair of optical fibers, namely, a first optical fiber 44 and a second optical fiber 42. In this embodiment, the light sensor 16 is optically connected to the first end of one optical fiber and the light source 32 is optically connected to the first end of the other optical fiber. As shown in FIG. 4, the second ends of the pair of optical fibers are optically connected within jig 26. The jig preferably includes an optical jumper 56 which provides a optical path to optically connect the second ends of the pair of optical fibers as illustrated in FIG. 4. As a result, the jig establishes a continuous optical path from the light sensor 16 to the light source 32. Thus, the light signal is emitted by the light source 32 of this embodiment, propagates through optical fiber 42, through the optical jumper 56, through optical fiber 44, and is received and detected by light sensor 16.

The photocurrent generated by the light sensor 16 of this embodiment is then processed in the manner described above so as to generate an audible signal having a variable frequency indicative of the intensity of the detected light signal and, as a result, indicative of the amount by which the optical fibers are bent during the installation process. Thus, the optical fiber monitoring apparatus 10 of this embodiment simultaneously and continuously monitors a pair of optical fibers while the optical fibers are advanced through or pulled along the predetermined path.

In a further embodiment, the optical fiber monitoring apparatus 10 can be expanded so as to monitor a plurality of optical fibers. In this embodiment, the jig 26 contains a plurality of optical jumpers 56 which optically connect the second ends of respective pairs of the plurality of optical fibers. Likewise, the first ends of a number of the optical fibers are also optically interconnected, such as with optical jumpers which optically connect respective pairs of the optical fibers. As a result of the optical interconnection of the optical fibers, the light sensor 16 and light source 32, are optically connected via a continuous optical path established by the plurality of optical fibers. In order to monitor an even number of optical fibers, for example, the source and the sensor are optically connected to the respective first ends of different ones of the optical fibers, while the second ends of the optical fibers are optically interconnected by passive jumpers within the pulling jig.

Figure 5:
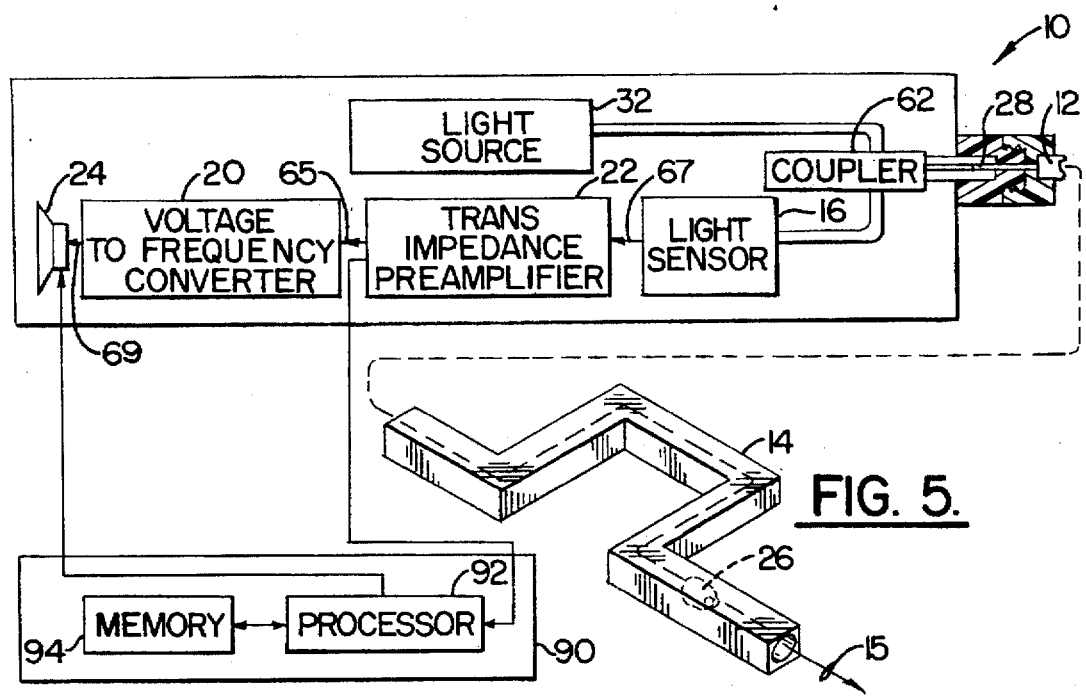
FIG. 5 is a schematic representation of an optical fiber monitoring apparatus of yet another embodiment of the present invention which also illustrates the installation of an optical fiber along a predetermined route.
Figure 6:
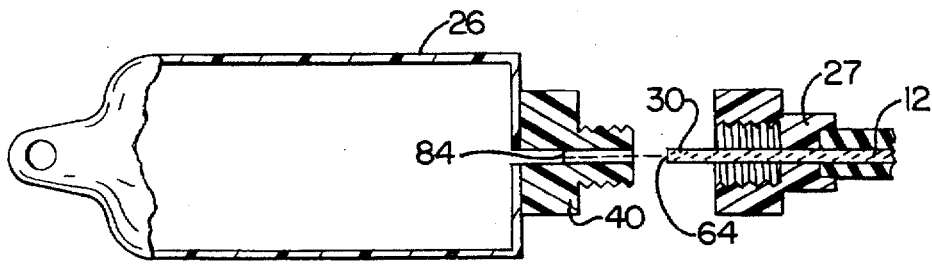
FIG. 6 is a cross-sectional view of a jig of the embodiment of the present invention shown in FIG. 5 which includes a partially reflective coating disposed adjacent one end of an optical fiber.

In another embodiment of the present invention illustrated in FIG. 5, the light sensor 16 and the light source 32 are optically connected to an optical coupler 62, such as a 3 dB hybrid directional coupler. The coupler 62 is, in turn, optically connected to the first end 28 of the optical fiber 12 to be monitored. As also shown in FIG. 5, the second end 30 of the optical fiber 12 is disposed within the jig 26 which is pulled along the predetermined path. According to this embodiment of the present invention, the second end of the optical fiber has a reflective coating 64 which reflects the light signal propagating through the optical fiber so as to create a reflected light signal. As a result, a continuous optical path is established between the optical source and the optical sensor even though both the optical source and the optical sensor are connected via the coupler to the first end of the same optical fiber. According to this embodiment, the second end of the optical fiber can actually be coated, such as with an evaporated metallic film 64, or the jig can include a reflective or mirrored surface 84 which is disposed adjacent the second end of the optical fiber.

By reflecting the optical signals from the reflective coating 64 or the mirrored surface 84, the active components of the optical fiber monitoring apparatus 10 can be disposed at the same end of the predetermined route within the same housing so as to simplify transportation and setup of the optical fiber monitoring apparatus. Although this embodiment of the optical fiber monitoring apparatus is described and illustrated in conjunction with a single optical fiber, the optical fiber monitoring apparatus of this embodiment can be employed in conjunction with two or more optical fibers in the manner described above in which the opposed ends of at least some of the optical fibers are optically connected, such as by optical jumpers 56, in order to form a continuous optical path through the plurality of optical fibers.

In addition to emitting an audible signal having a frequency which varies in relation to the intensity of detected light signal, the variable frequency signal 69 generated by the convertor 20 or the voltage signal 65 generated by the light sensor 16 and transimpedance preamplifier 22 can be provided to a digital or analog processor. In the exemplary embodiment shown in FIG. 5, the computer 90 includes processing means, such as a processor 92 and one or more associated memory elements 94, for detecting the frequency of the audible signals over time and for determining the rate of change of the frequency of the audible signals. The processor can also control or vary the amplitude or volume of the audio signals emitted by the audio transducer 24 in relation to the rate of change of the frequency of the audio signals. Thus, as the rate of change of the frequency of the audible signals increases, the controller can correspondingly increase the volume of the audible signals emitted by the audio transducer. In this fashion, the optical fiber monitoring method and apparatus 10 of the present invention can further prompt the installation personnel to take note of the frequency variations in the audible signals and to consider adjusting the installation procedure such that the optical fibers are not permanently damaged.

By listening to the frequency variations in the audio signals emitted by the optical fiber monitoring apparatus 10 of any of the embodiments of the present invention, installation personnel can detect signal loss through the optical fiber 12, such as signal loss introduced by excessive bending of the optical fiber during installation. Accordingly, the installation process can be halted or otherwise modified upon detecting that the optical fiber is being excessively bent to prevent damage to the optical fiber. Moreover, by monitoring the stress imparted to the optical fiber by listening for variations in the frequency of the audio signal, the installation personnel can effectively monitor the stress imparted to the optical fiber in an "eyes free" manner. Accordingly, the optical fiber monitoring method and apparatus of the present invention is particularly advantageous for monitoring the stress imparted on an optical fiber in a situation in which reading a dial or display would be distracting. Further, the variable frequency audio signal emitted by the optical fiber monitoring method and apparatus of the present invention could be transmitted to a remote location, such as via a telephone or radio circuit, to permit remote monitoring of the stresses imparted to the optical fibers, especially by installation personnel pulling the distant end of the fiber optic cable.

In the drawings and the specification, there has been set forth preferred embodiments of the invention, and, although specific terms are employed, the terms are used in a generic and descriptive sense only and not for the purpose of limitation, the scope of the invention being set forth in the following claims.

That which is claimed is:

1. An apparatus for monitoring signal loss along an optical fiber during installation of the optical fiber, the apparatus comprising:

an optical fiber;

a jig connected to one end of said optical fiber for facilitating installation of said optical fiber;

a light source, disposed within said jig and optically connected to said optical fiber, for providing a light signal to said optical fiber;

a light sensor, optically connected to the other end of said optical fiber, for detecting the light signal following propagation through said optical fiber and for providing an output signal based upon the detected light signal;

a converter, operably connected to said light sensor, for converting the output signal provided by said light sensor to an audio signal having a frequency which varies in relation to the detected light signal; and an audio transducer for outputting the audio signal such that signal loss along said optical fiber, introduced by bending of said optical fiber during installation, can be monitored based upon frequency variations in the audio signal.

2. An apparatus according to claim 1 wherein said converter provides an audio signal having a nominal frequency if the optical fiber is not bent, and wherein the apparatus further comprises means for controllably adjusting the nominal frequency of the audio signal provided by said converter.

3. An apparatus for monitoring signal loss along an optical fiber during installation of the optical fiber, the apparatus comprising:

an optical fiber;

a jig connected to one end of said optical fiber for facilitating installation of said optical fiber;

a light source, optically connected to said optical fiber, for providing a light signal to said optical fiber;

a light sensor, optically connected to other end of said optical fiber, for detecting the light signal following propagation through said optical fiber and for providing an output signal based upon the detected light signal;

a converter, operably connected to said light sensor, for converting the output signal provided by said light sensor to an audio signal having a frequency which varies in relation to the detected light signal;

processing means, operably connected to said converter, for determining a time rate of change of the frequency of the audio signals provided by said converter; and an audio transducer for outputting the audio signal such that signal loss along said optical fiber, introduced by bending of said optical fiber during installation, can be monitored based upon frequency variations in the audio signal.

4. An apparatus according to claim 3 further comprising a volume control means, responsive to said processing means, for adjusting the volume of the audio signals output by said audio transducer in response to the time rate of change of the frequency of the audio signals.

5. An apparatus for monitoring signal loss simultaneously along at least one of a plurality of optical fibers during installation of the optical fibers, the apparatus comprising:

a plurality of optical fibers extending between respective first and second ends;

a jig connected to the second end of each of said plurality of optical fibers for optically interconnecting said plurality of optical fibers;

a light source, optically connected to a first end of one of said optical fibers, for providing a light signal to said optical fibers;

a light sensor, optically connected to a first end of one of said optical fibers, for detecting the light signal following propagation through said plurality of optical fibers and for providing an output signal based upon the detected light signal;

a converter, operably connected to said light sensor, for converting the output signal provided by said light sensor to an audio signal having a frequency which varies in relation to the detected light signal; and an audio transducer for outputting the audio signal such that signal loss along said plurality of optical fibers, introduced by bending of said optical fibers during installation, can be monitored based upon frequency variations in the audio signal.

6. An apparatus according to claim 5 wherein said plurality of optical fibers comprises a pair of optical fibers, and wherein said jig optically interconnects the second ends of said pair of optical fibers to thereby establish a continuous optical path.

7. An apparatus according to claim 6 wherein said light sensor is optically connected to the first end of a first optical fiber of said pair of optical fibers and said light source is optically connected to the first end of a second optical fiber of said pair of optical fibers such that said pair of optical fibers establishes an optical path between said light sensor and said light source.

8. An apparatus according to claim 5 further comprising means for optically connecting the first ends of at least some of said optical fibers to thereby establish a continuous optical path through said plurality of optical fibers.

9. An apparatus according to claim 5 wherein said converter provides an audio signal having a nominal frequency if the optical fiber is not bent, and wherein the apparatus further comprises means for controllably adjusting the nominal frequency of the signal provided by said converter.

10. An apparatus according to claim 5 further comprising:

processing means, operably connected to said converter, for determining a time rate of change of the frequency of the audio signals provided by said converter; and volume control means, responsive to said processing means, for adjusting the volume of the audio signals output by said audio transducer in response to the time rate of change of the frequency of the audio signals.

11. A method for monitoring signal loss along an optical fiber during installation of the optical fiber, the method comprising the steps of:

attaching a jig to a leading end of an optical fiber;

installing an optical fiber by advancing the optical fiber along a predetermined route, said installing step comprising pulling the jig with a pulling force;

transmitting a light signal through said optical fiber during said installing step;

detecting the light signal following propagation through said optical fiber, wherein said detecting step is performed during said installing step and comprises providing an output signal based upon the detected light signal;

converting the output signal to an audio signal having a frequency which varies in relation to the detected light signal;

outputting the audio signal such that signal loss along said optical fiber, introduced by bending of said optical fiber during said installing step, can be monitored based upon frequency variations in the audio signal; and adjusting the pulling force with which the jig is pulled during said installing step based upon frequency variations in the audio signal.

12. A method according to claim 11 wherein the optical fiber has opposed first and second ends, and wherein said installing step comprises connecting a jig to the second end of said optical fiber and pulling said jig along the predetermined route.

13. A method according to claim 11 wherein the optical fiber has opposed first and second ends, wherein said transmitting step comprises introducing the light signal at the first end of the optical fiber, and wherein said detecting step comprises detecting the light signal at the second end of the optical fiber following propagation through the optical fiber.

14. A method according to claim 11 wherein the optical fiber has opposed first and second ends, wherein said transmitting step comprises introducing the light signal at the first end of the optical fiber, wherein said detecting step comprises detecting the signal at the first end of the optical fiber following round-trip propagation through the optical fiber, and wherein the method further comprises the step of reflecting the signal at the second end of said optical fiber.

15. A method according to claim 11 wherein the audio signals have a nominal frequency if the optical fiber is not bent, and wherein the method further comprises the step of controllably adjusting the nominal frequency of the audio signals.

16. A method for monitoring signal loss along an optical fiber during installation of the optical fiber, the method comprising the steps of:

installing an optical fiber by advancing the optical fiber along a predetermined route;

transmitting a light signal through said optical fiber during said installing step;

detecting the light signal following propagation through said optical fiber, wherein said detecting step is performed during said installing step and comprises providing an output signal based upon the detected light signal;

converting the output signal to an audio signal having a frequency which varies in relation to the detected light signal;

outputting the audio signal such that signal loss along said optical fiber, introduced by bending of said optical fiber during said installing step, can be monitored based upon frequency variations in the audio signal; and determining a time rate of change of the frequency of the audio signals.

17. A method according to claim 16 further comprising a step of adjusting the volume of the audio signals in response to the time rate of change of the frequency of the audio signals.

* * * * *